United States Patent
Fu

(10) Patent No.: US 10,571,105 B2
(45) Date of Patent: Feb. 25, 2020

(54) LIGHT-EMITTING APPARATUS

(71) Applicant: Guangzhou Tyrafos Semiconductor Technologies Co., LTD, Guangzhou (CN)

(72) Inventor: Hsu-Wen Fu, Kaohsiung (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 0 days.

(21) Appl. No.: 16/293,670

(22) Filed: Mar. 6, 2019

(65) Prior Publication Data

US 2020/0011514 A1   Jan. 9, 2020

(30) Foreign Application Priority Data

Jul. 5, 2018   (TW) .............................. 107123380 A

(51) Int. Cl.
*F21V 23/00* (2015.01)
*F21V 5/00* (2018.01)
*F21V 23/02* (2006.01)

(52) U.S. Cl.
CPC ............ *F21V 23/001* (2013.01); *F21V 5/002* (2013.01); *F21V 23/003* (2013.01); *F21V 23/02* (2013.01)

(58) Field of Classification Search
CPC ........ F21V 23/001; F21V 23/02; F21V 5/002; F21V 23/003

USPC ........................................................ 315/291
See application file for complete search history.

(56) References Cited

U.S. PATENT DOCUMENTS 6,339,486 B1 *   1/2002   Popovich ................. G02B 5/32
                                                        348/40

FOREIGN PATENT DOCUMENTS

TW    201400759    1/2014
TW    201504559    2/2015

OTHER PUBLICATIONS

"Office Action of Taiwan Counterpart Application," dated Nov. 29, 2019, p. 1-p. 7.

* cited by examiner

*Primary Examiner* — Don P Le
(74) *Attorney, Agent, or Firm* — JCIPRNET

(57) ABSTRACT

A light-emitting apparatus including a light source, a light-diverging element, a conductive structure, and a drive control module is provided. The light source is used to emit a light beam. The light-diverging element is disposed on a transmission path of the light beam, wherein after the light beam passes through the light-diverging element, a plurality of light beams separated from each other are produced. The conductive structure is disposed on a first surface of the light-diverging element. The drive control module is used to drive the light source and is electrically connected to the light source and the conductive structure.

11 Claims, 4 Drawing Sheets

LIGHT-EMITTING APPARATUS

CROSS-REFERENCE TO RELATED APPLICATION

This application claims the priority benefit of Taiwan application serial no. 107123380, filed on Jul. 5, 2018. The entirety of the above-mentioned patent application is hereby incorporated by reference herein and made a part of this specification.

BACKGROUND OF THE INVENTION

Field of the Invention

The invention is related to an optical apparatus, and more particularly, to a light-emitting apparatus.

Description of Related Art

The architecture of a 3D sensing technique may include a multi-spot emitter and a photosensor. The multi-spot emitter may include a light source and an optical element for splitting a light beam. In general, a laser source is often used as the light source so that laser beams may still have sufficient intensity after being split by the optical element. However, when the optical element is detached or broken, the laser may be emitted without being split, and if irradiated to the human eye, burn injury may occur.

SUMMARY OF THE INVENTION

An embodiment of the invention provides a light-emitting apparatus capable of performing security measures in a simpler manner.

An embodiment of the invention provides a light-emitting apparatus including a light source, a light-diverging element, a conductive structure, and a drive control module. The light source is used to emit a light beam. The light-diverging element is disposed on a transmission path of the light beam, wherein after the light beam passes through the light-diverging element, a plurality of light beams separated from each other are produced. The conductive structure is disposed on a first surface of the light-diverging element. The drive control module is used to drive the light source and is electrically connected to the light source and the conductive structure.

In an embodiment of the invention, the drive control module includes a power supply and a controller. The power supply is used to provide power to the light source, wherein a series circuit is formed between the conductive structure, the light source, and the power supply.

The controller is electrically connected to the power supply.

In an embodiment of the invention, the drive control module includes a sensor, a power supply, and a controller. The sensor is electrically connected to the conductive structure and is used to sense a current flowing through the conductive structure. The power supply is used to provide power to the light source. The controller is electrically connected to the sensor and the power supply, wherein the controller is adapted to turn off the power supply when the current sensed by the sensor is less than a safe current.

In an embodiment of the invention, the conductive structure is in the form of a sheet.

In an embodiment of the invention, the light-diverging element has a plurality of optical microstructures, and the plurality of optical microstructures are disposed on a second surface opposite to the first surface.

In an embodiment of the invention, the conductive structure is in the form of a mesh.

In an embodiment of the invention, the conductive structure includes a plurality of conductive dots and a plurality of conductive wires, and the plurality of conductive wires connect the plurality of conductive dots to each other in series.

In an embodiment of the invention, the light-diverging element has a plurality of optical microstructures, and the plurality of optical microstructures are disposed on the first surface and are separated from the conductive structure.

In an embodiment of the invention, the light-diverging element has a plurality of optical microstructures, and the plurality of optical microstructures are disposed on a second surface opposite to the first surface.

In an embodiment of the invention, an orthographic projection of the conductive structure on the second surface of the light-diverging element is separated from the plurality of optical microstructures.

In an embodiment of the invention, an orthographic projection of the conductive structure on the second surface of the light-diverging element overlaps the plurality of optical microstructures.

In an embodiment of the invention, the light-diverging element includes a diffractive optical element or a lens array.

Based on the above, in the light-emitting apparatus of the embodiments of the invention, since a conductive structure is provided on the light-diverging element, when the light-diverging element is detached or broken, the conductive structure and the drive control module may be electrically disconnected. Therefore, whether the light-diverging element is detached or broken may be known via the conductive structure, and thereby a mechanism of security protection may be implemented. As a result, the light-emitting apparatus of the embodiments of the invention may provide security measures in a simpler manner.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
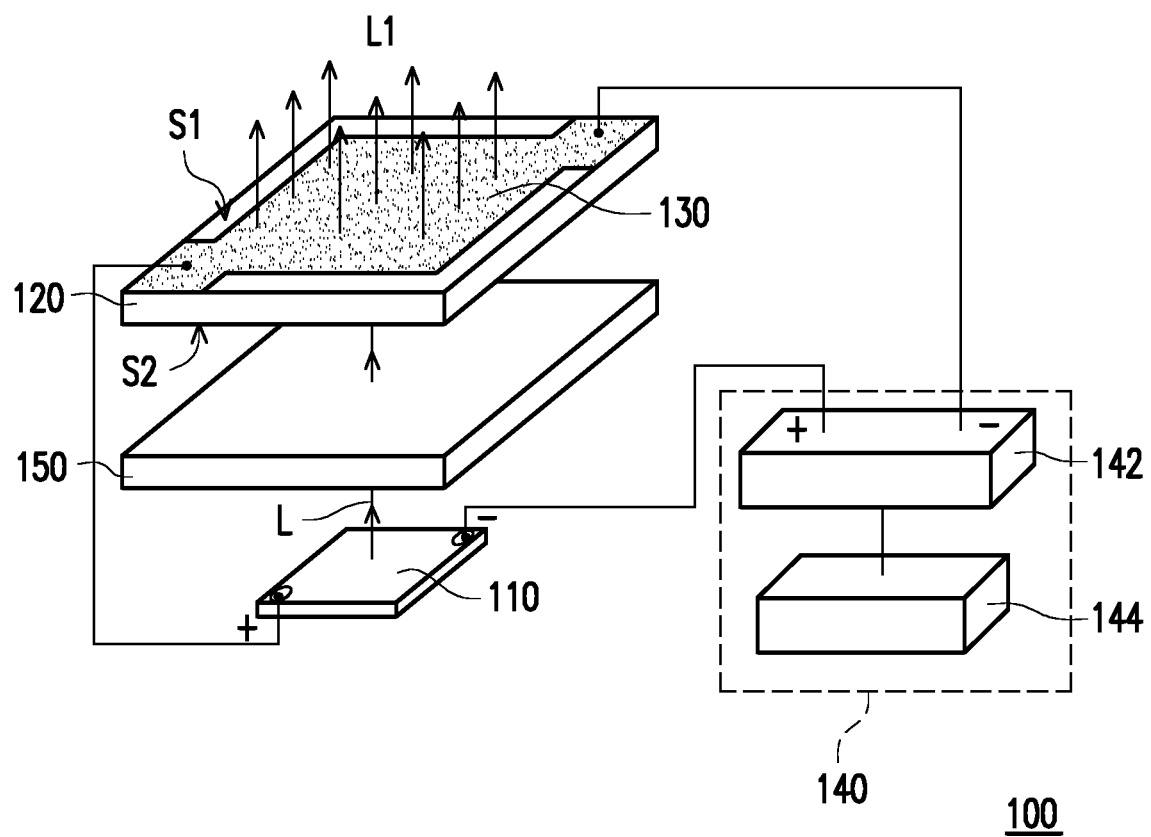
FIG. 1 is a schematic view of the architecture of a light-emitting apparatus of an embodiment of the invention.

FIG. 1 is a schematic view of the architecture of a light-emitting apparatus of an embodiment of the invention.

Referring to FIG. 1, a light-emitting apparatus 100 of the present embodiment includes a light source 110, a light-diverging element 120, a conductive structure 130, and a drive control module 140. The light source 110 is used to emit a light beam L. The light-diverging element 120 is disposed on a transmission path of the light beam L, wherein after the light beam L passes through the light-diverging element 120, a plurality of light beams L1 separated from each other are produced. The conductive structure 130 is disposed on a first surface S1 of the light-diverging element 120. The drive control module 140 is used to drive the light source 110 and is electrically connected to the light source 110 and the conductive structure 130. In the present embodiment, the light source 110 is, for example, a laser light source. In other embodiments, the light source 110 may be a light-emitting diode (LED) light source or other suitable light sources. In the present embodiment, the light-diverging element 120 is, for example, a diffractive optical element (DOE), a lens array, or other optical elements having a light-splitting effect, and the invention is not limited thereto.

In the present embodiment, the drive control module 140 includes a power supply 142 and a controller 144. The power supply 142 is used to provide power to the light source 110 to cause the light source 110 to emit the light beam L. The controller 144 is electrically connected to the power supply 142 such that the power supply 142 provides power to the light source 110. As shown in FIG. 1, a series circuit is formed between the conductive structure 130, the light source 110, and the power supply 142. When the light-diverging element 120 is detached, the conductive structure 130 disposed on the light-diverging element 120 is electrically disconnected from the power supply 142, and therefore the power supply 142 connected in series is no longer able to provide power to the light source 110. As a result, the light source 110 may be prevented from continuously emitting the light beam L to achieve the effect of security protection. Alternatively, when the light-diverging element 120 breaks such that the conductive structure 130 disposed on the light-diverging element 120 forms an open circuit, the power supply 142 connected in series also cannot provide power to the light source 110. As a result, the light source 110 may be prevented from continuously emitting the light beam L to achieve the effect of security protection.

In an embodiment, the controller 144 is, for example, a central processing unit (CPU), a microprocessor, a digital signal processor (DSP), a programmable controller, a programmable logic device (PLD), other similar apparatuses, or a combination of these apparatuses, and the invention is not limited thereto. Moreover, in an embodiment, each function of the controller 144 may be implemented as a plurality of program codes. These program codes are stored in one memory, and the program codes are executed by the controller 144. Alternatively, in an embodiment, each function of the controller 144 may be implemented as one or a plurality of circuits. The invention does not limit whether each function of the controller 144 is implemented in a software or hardware form.

In addition, the light-diverging element 120 has a plurality of optical microstructures disposed on a second surface S2 opposite to the first surface S1. In the present embodiment, the first surface S1 of the light-diverging element 120 is located at a side away from the light source 110, and the second surface S2 of the light-diverging element 120 is located at a side close to the light source 110. In other embodiments, the first surface S1 of the light-diverging element 120 may be located at a side close to the light source 110, and the second surface S2 of the light-diverging element 120 may be located at a side away from the light source 110.

In the present embodiment, the plurality of optical microstructures of the light-diverging element 120 may be formed before the conductive structure 130 is formed or may be formed after the conductive structure 130 is formed. For example, a conductive structure 130 having a specific pattern may be formed on one of the surfaces of the transparent substrate of the light-diverging element 120 first, and then the optical microstructures may be formed on another surface of the transparent substrate. Alternatively, the optical microstructures may be formed on one of the surfaces of the transparent substrate of the light-diverging element 120 first, and then the conductive structure 130 having a specific pattern may be formed on another surface of the transparent substrate. In addition, the conductive structure 130 is formed, for example, by a manufacturing method such as lithography, lift-off, or metal mask vacuum coating. The optical microstructures are formed, for example, by a manufacturing method such as lithography or imprinting.

In the present embodiment, the light-emitting apparatus 100 may further include a light beam-shaping element 150 disposed between the light source 110 and the light-diverging element 120. The light beam-shaping element 150 is, for example, used to expand the light beam L emitted from the light source 110. For example, the light beam-shaping element 150 is, for example, a diverging lens or other suitable optical elements, and the invention is not limited thereto.

Figure 2A:
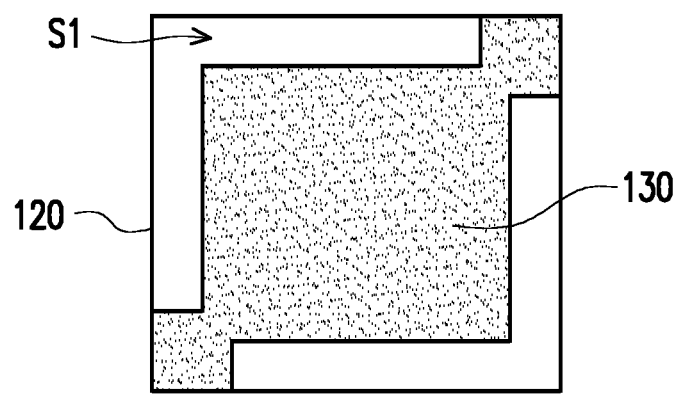
FIG. 2A is a top view of the light-diverging element and the conductive structure in FIG. 1.
Figure 2B:
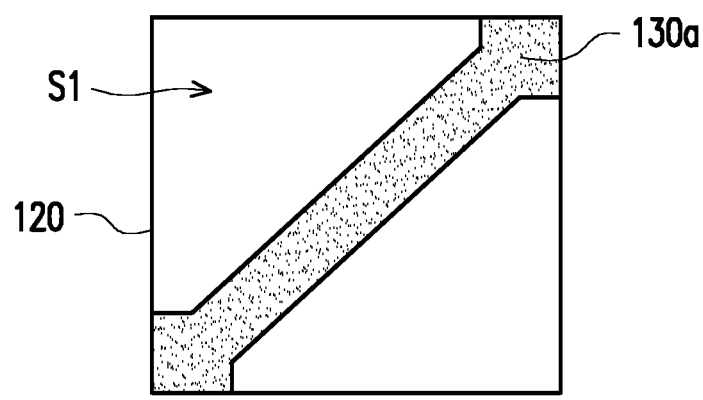
FIG. 2B and FIG. 2C are top views of a light-diverging element and a conductive structure of some other embodiments of the invention.
Figure 2C:
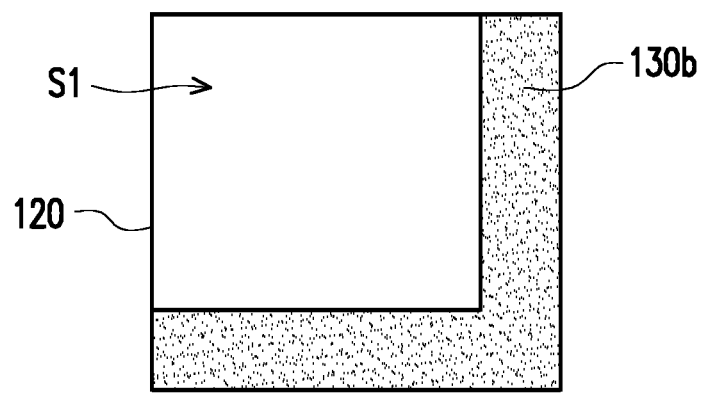

FIG. 2A is a top view of the light-diverging element and the conductive structure in FIG. 1. FIG. 2B and FIG. 2C are top views of a light-diverging element and a conductive structure of some other embodiments of the invention. Referring to FIGS. 2A to 2C, the conductive structure of the present embodiment may be in the form of a sheet. Specifically, as shown in FIG. 2A, the conductive structure 130 may cover the majority of the area of the first surface S1 of the light-diverging element 120, and the conductive structure 130 has a shape that is substantially a rectangle. As shown in FIG. 2B, a conductive structure 130a may cover only a portion of the middle of the light-diverging element 120, and the conductive structure 130a has a shape that is substantially a double arrow. As shown in FIG. 2C, a conductive structure 130b may cover only a portion of the edges of the light-diverging element 120, and the conductive structure 130b has a shape that is substantially an L shape.

It should be noted that the conductive structure 130, the conductive structure 130a, and the conductive structure 130b shown in FIG. 2A, FIG. 2B, and FIG. 2C are transparent conductive layers, such as indium tin oxide (ITO), indium zinc oxide (IZO), or other transparent conductive films. Therefore, the conductive structure 130 does not affect the passage of the light beams L1 (or the light beam L). In addition, the conductive structure 130, the conductive structure 130a, and the conductive structure 130b and the plurality of optical microstructures of the light-diverging element 120 are disposed on different surfaces, and thus also do not affect the optical properties of the light-diverging element 120.

Figure 3A:
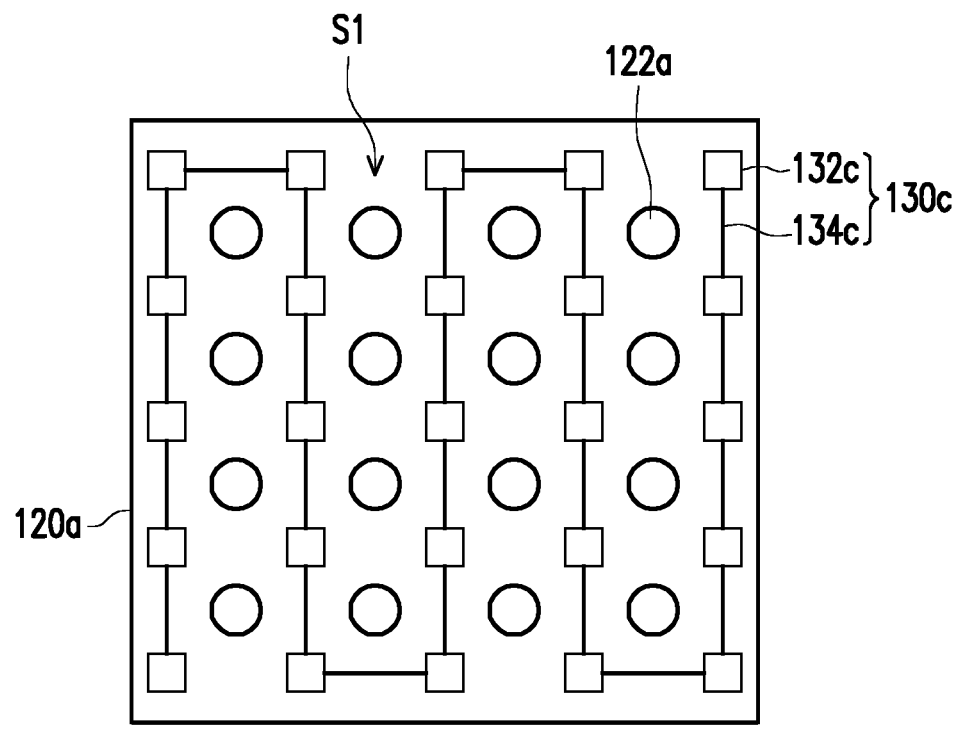
FIG. 3A and FIG. 3B are top views of a light-diverging element and a conductive structure of some other embodiments of the invention.
Figure 3B:
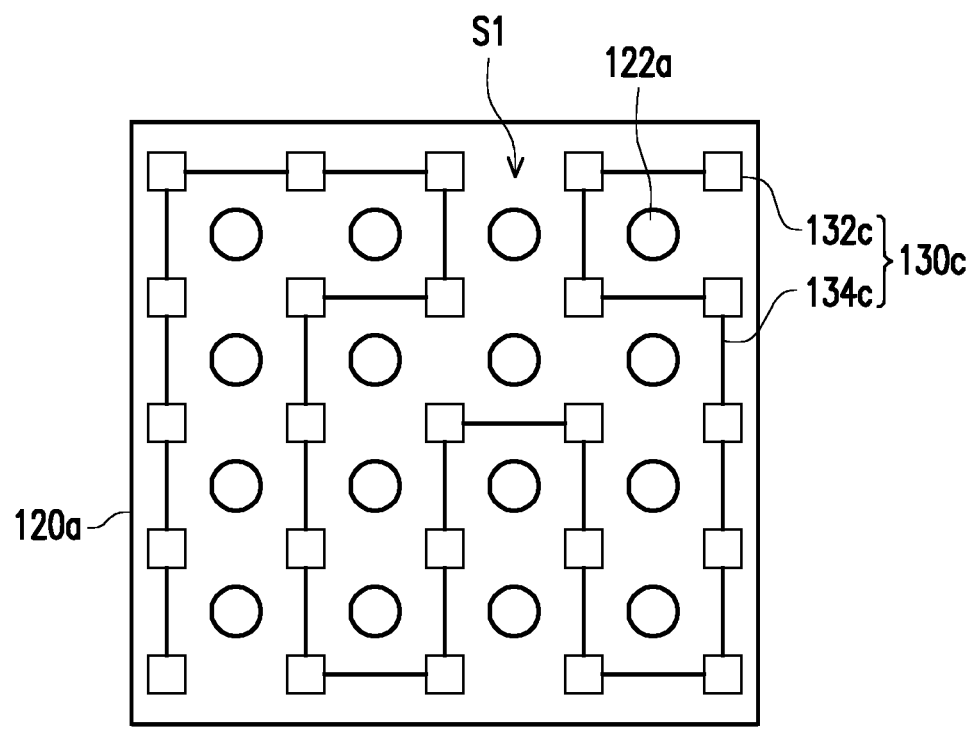

FIG. 3A and FIG. 3B are top views of a light-diverging element and a conductive structure of some other embodiments of the invention. Referring to FIG. 3A and FIG. 3B, the conductive structure of the present embodiment is in the form of a mesh. Specifically, as shown in FIG. 3A and FIG. 3B, a conductive structure 130c includes a plurality of conductive dots 132c and a plurality of conductive wires 134c, and the conductive wires 134c connect the conductive dots 132c to each other in series, so as to form a mesh circuit. As shown in FIG. 3A, the plurality of conductive dots 132c and the plurality of conductive wires 134c of the conductive structure 130c may be connected in series in a regularly-arranged bent form. As shown in FIG. 3B, the plurality of conductive dots 132c and the plurality of conductive wires 134c of the conductive structure 130c may also be connected in series in an irregular bent form, and the invention is not limited thereto.

Since the conductive structure 130c on the light-diverging element 120a is mesh-shaped, and the circuits between the two ends of the conductive structure 130c are connected in series, even if the light-diverging element 120a is only partially broken, the conductive dots 132c or the conductive wires 134c at the partially broken area may still form an open circuit to prevent the light source 110 from continuously emitting the light beam L, so as to further enhance the effect of security protection.

In the present embodiment, the conductive dots 132c in FIG. 3A and FIG. 3B are exemplified by rectangles. In other embodiments, the conductive dots 132c may be circular or other shapes. Further, the conductive structure 130c may also not have the conductive dots 132c as long as the circuits between the two ends of the conductive structure 130c are connected in series.

In the present embodiment, the conductive structure 130c and a plurality of optical microstructures 122a of the light-diverging element 120a are disposed on the same surface of the light-diverging element 120a, and the conductive structure 130c (the plurality of conductive dots 132c and the plurality of conductive wires 134c) are separated from the optical microstructures 122a. For example, the conductive structure 130c and the plurality of optical microstructures 122a of the light-diverging element 120a are both disposed on the first surface S1, and the conductive structure 130c is separated from the optical microstructures 122a. In the present embodiment, the conductive structure 130c may be a transparent conductive layer or an opaque conductive layer (for example, a metal), and neither affects the optical effect of the light-diverging element 120a.

In other embodiments, the conductive structure 130c and the plurality of optical microstructures 122a of the light-diverging element 120a may be respectively disposed on different surfaces of the light-diverging element 120a, and the orthographic projection of the conductive structure 130c perpendicular on another surface of the light-diverging element 120a may be separated from or overlap the optical microstructures 122a. For example, the conductive structure 130c and the plurality of optical microstructures 122a of the light-diverging element 120a may be respectively disposed on the first surface S1 and the second surface S2 of the light-diverging element 120a. Here, if the orthographic projection of the conductive structure 130c on the second surface S2 of the light-diverging element 120a is separated from the optical microstructures 122a, then the conductive structure 130c may be a transparent conductive layer or an opaque conductive layer. If the orthographic projection of the conductive structure 130c on the second surface S2 of the light-diverging element 120a overlaps the optical microstructures 122a, then the conductive structure 130c may be a transparent conductive layer.

Figure 4:
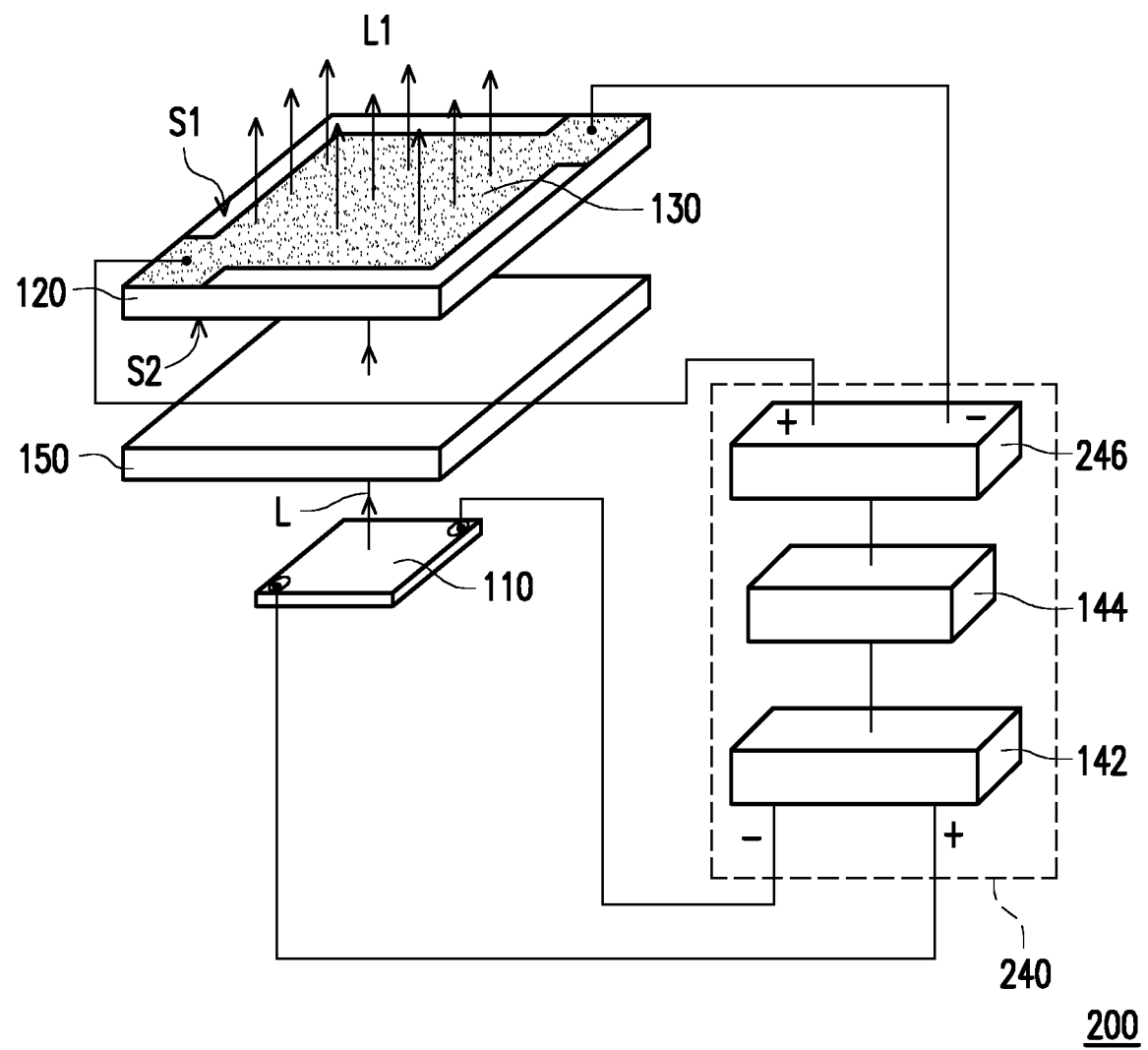
FIG. 4 is a schematic view of the architecture of a light-emitting apparatus of another embodiment of the invention.

FIG. 4 is a schematic of the architecture of a light-emitting apparatus of another embodiment of the invention. Referring to FIG. 4, a light-emitting apparatus 200 of the present embodiment is substantially similar to the light-emitting apparatus 100 of FIG. 1. The main difference is that a drive control module 240 of the present embodiment further includes a sensor 246 electrically connected to the conductive structure 130 and is used to sense a current flowing through the conductive structure 130. In addition, the controller 144 of the present embodiment is electrically connected to a sensor 246 and the power supply 142. The controller 144 is adapted to turn off the power supply 142 when the current sensed by the sensor 246 is less than a safe current.

In detail, in the case that the light-emitting apparatus 200 is normally used, that is, the light-diverging element 120 is not detached or broken, the sensor 246 may measure an initial current. When the light-diverging element 120 is broken, the resistance of the conductive structure 130 may be increased due to the breakage, and thus the current measured by the sensor 246 is reduced. In the present embodiment, the safe current may be defined as a specific ratio of the initial current, such as 80%. That is, when the current sensed by the sensor 246 is less than 80% of the initial current, the sensor 246 passes this information to the controller 144. At this time, the controller 144 turns off the power supply 142 so that the light source 110 stops emitting the light beam L, so as to achieve the effect of security protection. In other embodiments, the safe current may also be defined as other suitable ratios of the initial current value, and the invention is not limited thereto.

The light-diverging element 120 and the conductive structure 130 of the present embodiment are exemplified by the forms shown in FIG. 2A. In other embodiments, the light-diverging element 120 and the conductive structure 130 of the light-emitting apparatus 200 may also have the forms such as those shown in FIG. 2B, FIG. 2C, FIG. 3A, or FIG. 3B, and the invention is not limited thereto.

In summary, the two simple mechanisms of security protection above with the conductive structure are adopted in the light-emitting apparatus of the embodiments of the invention to achieve the effect of security protection. The first is a design in which the conductive structure 130, the light source 110, and the power supply 142 form a series circuit. The second is a design in which the sensor 246 is adopted to sense the current flowing through the conductive structure 130. Via the two mechanisms of security protection above, when the light-diverging element 120 is detached or broken, the light source 110 may be effectively prevented from continuing to emit the light beam L.

Based on the above, in the light-emitting apparatus of an embodiment of the invention, since a conductive structure is provided on the light-diverging element, when the light-diverging element is detached or broken, the conductive structure and the drive control module may be electrically disconnected. Therefore, whether the light-diverging element is detached or broken may be known via the conductive structure, and thereby a mechanism of security protection may be implemented. As a result, the light-emitting apparatus of the embodiments of the invention may provide security measures in a simpler manner. In addition, when a mesh circuit is adopted in the conductive structure, even if the light-diverging element is only partially broken, the conductive structure at the partially broken area may still form an open circuit to prevent the light source from continuously emitting a light beam, and therefore the effect of security protection may be further enhanced.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A light-emitting apparatus, comprising:
   a light source, used to emit a light beam;
   a light-diverging element, disposed on a transmission path of the light beam, wherein after the light beam passes through the light-diverging element, a plurality of light beams separated from each other are produced;
   a conductive structure, disposed on a first surface of the light-diverging element; and
   a driver, used to drive the light source and electrically connected to the light source and the conductive structure,
   wherein the driver comprises:
      a power supply, used to provide a power to the light source, wherein a series circuit is formed between the conductive structure, the light source, and the power supply; and
      a controller, electrically connected to the power supply.

2. The light-emitting apparatus of claim 1, wherein the driver further comprises:
   a sensor, electrically connected to the conductive structure and used to sense a current flowing through the conductive structure;
   a power supply, used to provide a power to the light source; and
   a controller, electrically connected to the sensor and the power supply, wherein the controller is adapted to turn off the power supply when the current sensed by the sensor is less than a safe current.

3. The light-emitting apparatus of claim 1, wherein the conductive structure is in a form of a sheet.

4. The light-emitting apparatus of claim 3, wherein the light-diverging element has a plurality of optical microstructures, and the plurality of optical microstructures are disposed on a second surface opposite to the first surface.

5. The light-emitting apparatus of claim 1, wherein the conductive structure is in a form of a mesh.

6. The light-emitting apparatus of claim 5, wherein the conductive structure comprises a plurality of conductive dots and a plurality of conductive wires, and the plurality of conductive wires connect the plurality of conductive dots to each other in series.

7. The light-emitting apparatus of claim 5, wherein the light-diverging element has a plurality of optical microstructures, and the plurality of optical microstructures are disposed on the first surface and are separated from the conductive structure.

8. The light-emitting apparatus of claim 5, wherein the light-diverging element has a plurality of optical microstructures, and the plurality of optical microstructures are disposed on a second surface opposite to the first surface.

9. The light-emitting apparatus of claim 8, wherein an orthographic projection of the conductive structure on the second surface of the light-diverging element is separated from the plurality of optical microstructures.

10. The light-emitting apparatus of claim 8, wherein an orthographic projection of the conductive structure on the second surface of the light-diverging element overlaps the plurality of optical microstructures.

11. The light-emitting apparatus of claim 1, wherein the light-diverging element comprises a diffractive optical element or a lens array.

* * * * *